Aug. 6, 1957 B. CASANOVAS 2,801,467
SCISSORS FOR CUTTING SHEET METAL
Filed May 4, 1956
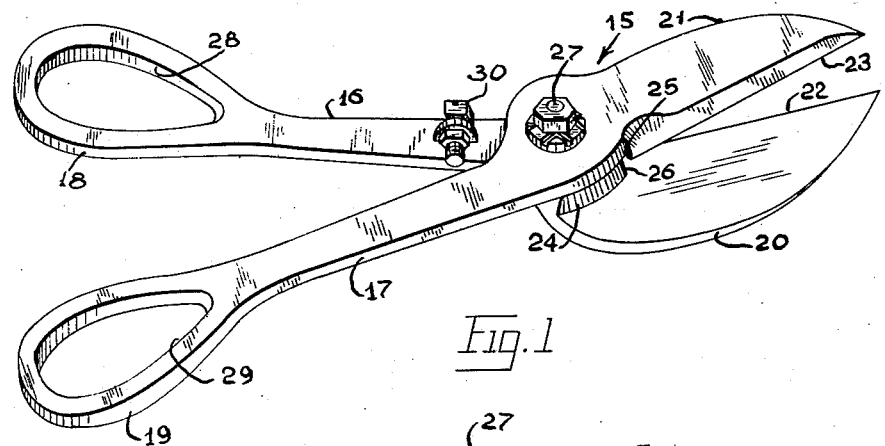
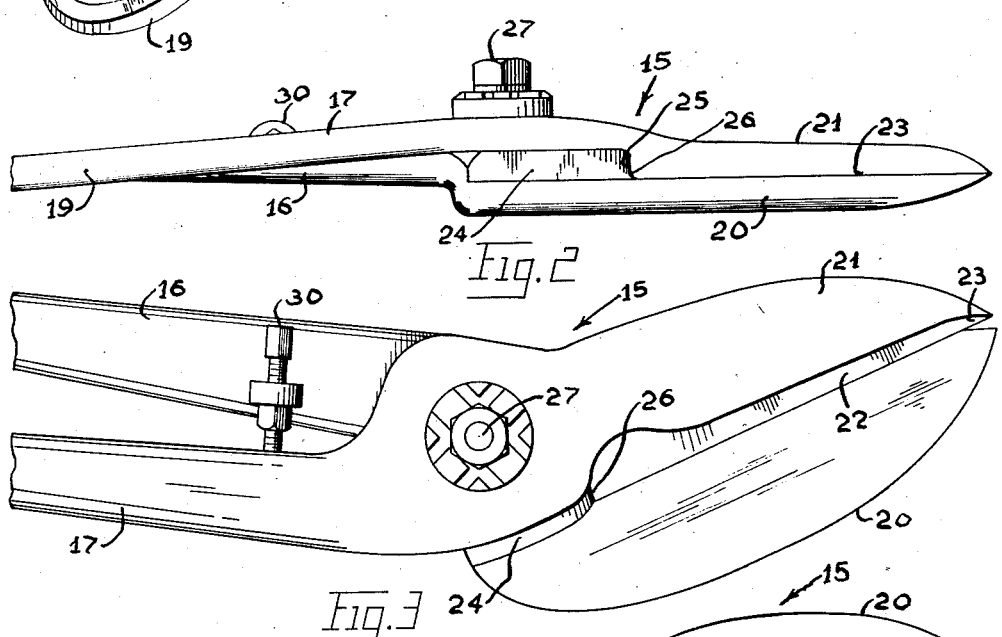
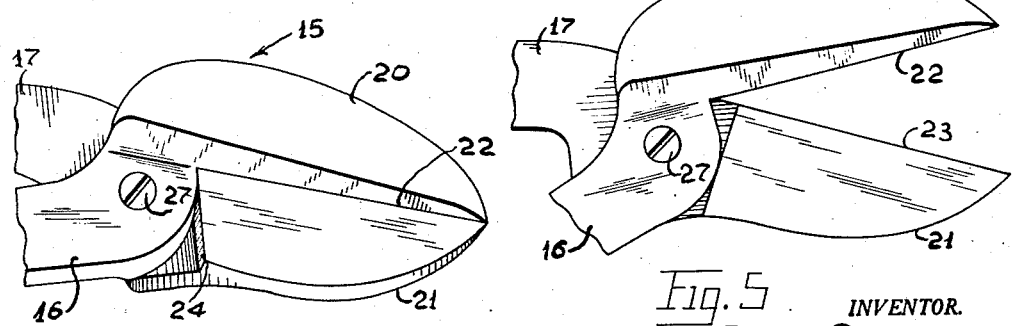
INVENTOR.
BLAS CASANOVAS
BY
ATTORNEY

2,801,467

SCISSORS FOR CUTTING SHEET METAL

Blas Casanovas, New York, N. Y.

Application May 4, 1956, Serial No. 582,738

1 Claim. (Cl. 30—254)

This invention relates to new and useful improvements in metal cutting shears and the like.

More particularly, the present invention proposes the construction of an improved pair of sheet metal cutting shears which can be used to cut sheet metal without the cut-off portion curling or otherwise being bent out of shape.

As a further object, the present invention proposes forming the shears with a raised portion adjacent the cutting edge of one lever on the other lever to act as a continuation of that cutting edge and guide cut-off sheet metal from the cutting edge.

Still further, the present invention proposes constructing the shears with two diagonally crossed levers pivotally held together by a pin extending through the raised portion on one lever and providing the other lever with a recess movably to seat the raised portion.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a perspective view of a pair of metal cutting shears constructed and arranged in accordance with the present invention.

Fig. 2 is a side elevational view of the shears with the handle portions broken away.

Fig. 3 is a top plan view of the structure shown in Fig. 2.

Fig. 4 is a view similar to Fig. 3 but showing the bottom or other side.

Fig. 5 is a view similar to Fig. 4 but showing the jaws partly open.

Referring more particularly to the drawings, the sheet metal cutting shears of the present invention are designated generally by the reference numeral 15.

Shears 15 have levers 16 and 17 which are diagonally crossed and have handle portions 18 and 19 and blade or jaw portions 20 and 21 respectively.

Blade or jaw portions 20 and 21 of levers 16 and 17 have opposed cutting edges 22 and 23, said blade portions being offset laterally from the axes of the levers and offset from the planes of the levers.

Lever 16 has a raised portion 24 adjacent the cutting edge 23 of lever 17 disposed as a continuation of the cutting edge 23 to guide cut-off sheet metal and the like from the jaws or blade portions and to prevent curling of the cut-off metal.

Lever 17 has a recess 25 movably to seat the raised portion 24 of lever 16, an arcuate curved end wall 26 being disposed in the recess. The lever is enlarged where it is superposed over the raised portion 24, the enlargement and raised portion having conforming curved peripheral edges.

A bolt 27 extends through the raised portion 24 of lever 16 and through the lever 17 at the recess 25 to serve as a connecting member for the crossed levers.

Handle portions 18 and 19 have the usual hand or thumb openings 28 and 29 and a setscrew stop 30 is provided on lever 17 to adjust the jaw opening of the shears.

While I have illustrated and described the preferred embodiment fo my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

Shears consisting of a pair of shear members, each member consisting of a lever having an elongated handle portion and an elongated blade portion extending from the inner end of the handle portion, said blade portions being disposed offset laterally from the axes of said levers and offset from the planes of the levers, said blade portions having opposed straight cutting edges, one of said members having a raised portion on its blade portion adjacent its lever, said raised portion being disposed to one side of the longitudinal center of the blade portion on the side of its cutting edge and having a curved outer peripheral edge, the other member having a lateral enlargement on the inner edge of its lever over said raised portion, and having a complemental recess in its undersurface to receive said raised portion, said raised portion and enlargement having aligned openings therethrough, a bolt passing through said aligned openings for pivotally connecting the members to one another, said enlargement having an outwardly curved peripheral edge conforming to the curvature of the outer edge of the raised portion and having an inwardly curved peripheral edge forming a continuation of said outwardly curved edge portion, said inwardly curved edge portion merging into the straight cutting edge of said member for guiding cut-off sheet metal strips and for preventing such cut metal strips from curling.

References Cited in the file of this patent

UNITED STATES PATENTS

| 398,509 | Henckels | Feb. 26, 1889 |
|---|---|---|
| 1,080,145 | Friederick | Dec. 2, 1913 |
| 1,760,627 | Bernard | May 27, 1930 |
| 2,078,585 | Rauh | Apr. 27, 1937 |
| 2,491,712 | Campbell | Dec. 20, 1949 |
| 2,517,471 | Ewart | Aug. 1, 1950 |

FOREIGN PATENTS

| 665,051 | Great Britain | Jan. 16, 1952 |
|---|---|---|